(12) United States Patent
Pothanikat et al.

(10) Patent No.: US 7,950,609 B2
(45) Date of Patent: May 31, 2011

(54) ACOUSTIC DAMPENING PIPE SHOE

(75) Inventors: John J. Pothanikat, Missouri City, TX (US); Edward Earl Schauseil, II, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 196 days.

(21) Appl. No.: 12/175,880

(22) Filed: Jul. 18, 2008

(65) Prior Publication Data

US 2008/0272248 A1 Nov. 6, 2008

Related U.S. Application Data

(63) Continuation-in-part of application No. 11/506,327, filed on Aug. 18, 2006, now Pat. No. 7,467,766.

(51) Int. Cl.
*F16L 3/08* (2006.01)

(52) U.S. Cl. ............. 248/65; 248/55; 248/560; 248/632

(58) Field of Classification Search ............... 248/65, 248/55, 560, 632, 633
See application file for complete search history.

(56) References Cited

U.S. PATENT DOCUMENTS

| | | | |
|---|---|---|---|
| 2,790,614 A | 4/1957 | Miller | |
| 3,606,218 A | 9/1971 | Enlund et al. | |
| 3,856,544 A * | 12/1974 | Benner et al. | 524/5 |
| 3,891,006 A | 6/1975 | Lee | |
| 3,980,262 A | 9/1976 | Lee | |
| 4,185,802 A | 1/1980 | Myles et al. | |
| 4,323,088 A | 4/1982 | McClellan | |
| 4,530,478 A | 7/1985 | McClellan | |
| 4,787,583 A | 11/1988 | Morton | |
| 4,804,158 A | 2/1989 | Collins et al. | |
| 4,951,902 A | 8/1990 | Hardtke | |
| 5,300,355 A * | 4/1994 | Mifune et al. | 428/215 |
| 5,381,833 A | 1/1995 | Cummings et al. | |
| 5,731,359 A | 3/1998 | Moser et al. | |
| 5,855,353 A * | 1/1999 | Shaffer et al. | 248/638 |
| 5,924,656 A | 7/1999 | Okada et al. | |
| 5,942,656 A | 8/1999 | Slaugh et al. | |
| 5,947,425 A | 9/1999 | Gerster | |
| 6,575,412 B2 | 6/2003 | Klezath | |
| 6,604,715 B2 | 8/2003 | Howe | |
| 7,213,790 B2 | 5/2007 | Bailey et al. | |

(Continued)

FOREIGN PATENT DOCUMENTS

EP 0060547 3/1982

(Continued)

OTHER PUBLICATIONS

Acoustic Insulation, Glacier Bay, Inc. Power and Thermal Management Technologies, Glacier Bay, Inc.

(Continued)

*Primary Examiner* — Anita M King
(74) *Attorney, Agent, or Firm* — KBR IP Legal Dept.

(57) ABSTRACT

A pipe support for dampening acoustic propagation from a pipeline is provided. The pipe support can include a support base and a movable base spatially arranged from the support base. One or more fasteners can be disposed through the movable base to the support base, thereby connecting the movable base to the support base. One or more acoustic isolators can be disposed between an upper surface of the support base and a lower surface of the movable base.

29 Claims, 8 Drawing Sheets

U.S. PATENT DOCUMENTS

| | | | |
|---|---|---|---|
| 7,472,870 B2 * | 1/2009 | Zagorski et al. | 248/65 |
| 2008/0042018 A1 | 2/2008 | Pothanikat et al. | |

FOREIGN PATENT DOCUMENTS

| | | |
|---|---|---|
| EP | 0159958 | 2/1985 |
| EP | 0884518 | 6/1998 |
| GB | 2315707 | 1/1998 |

OTHER PUBLICATIONS

Marinite® P data sheet, BNZ Materials, Inc., BNZ R-440 Nov. 1992.
Pyrogel XT Flexible Industrial Insulation for High-Temperature Applications, Aspen Aerogels Nanotechnology at Work, 2008, pp. 1-2, Aspen Aerogels Inc., Northborough, MA.
Unicoat 5800 material data sheet, Unicoat International.

* cited by examiner

US 7,950,609 B2

ACOUSTIC DAMPENING PIPE SHOE

CROSS REFERENCE TO RELATED APPLICATION

This application is a continuation-in-part of co-pending application having Ser. No. 11/506,327, filed on Aug. 18, 2006, which is incorporated by reference herein.

BACKGROUND

1. Field

The present embodiments generally relate to systems and apparatus for supporting pipe. More particularly, embodiments relate to a noise dampening pipe shoe and systems using the same.

2. Description of the Related Art

Pipe shoes are utilized in various industries to support piping. Vibrations, for example, from the processing or flow of fluids, can propagate through pipe, pipe shoes, and supporting structure and lead to significant noise emissions therefrom. Occupational noise exposure is frequently regulated, for example by United States' Occupational Safety & Health Administration (OSHA) standards. Noise abatement in cold insulated, ambient temperature and/or small diameter piping is frequently effected simply by insulating the pipe itself. Hot piping, on the other hand, especially in the 50 mm and greater diameters, presents unique problems for noise control because methods and/or materials suitable for isolating cold piping can be inadequate if exposed to the high temperatures and/or compressive forces in a hot pipe where it is supported on a pipe shoe or other support device.

Pipe shoes commonly include a base and a pair of axially spaced clamps for interconnecting a generally lower semi-circular clamp fixed to the base to a generally upper semi-circular clamp, so that the connected clamps support the piping. The base may slide along the planar upper surface of the pipe rack as the process pipe expands or contracts in length. The generally lower clamp half is welded to the base, so that the weight of the pipe is supported on the generally lower clamp half Ears project radially outward from both the lower and upper clamp halves, and a pair of conventional bolts interconnects the mating radially-opposing ears to secure the piping to the pipe shoe.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The embodiments are detailed below with reference to the listed Figures.

DETAILED DESCRIPTION OF THE EMBODIMENTS

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

An embodiment is a pipe support system for dampening acoustic propagation from a vibrating or oscillating member, for example a pipe. The pipe support system can include an acoustic isolator disposed for compression between opposing top and support bases, a pipe support member connected between the movable base and a pipe supported thereby, and at least one fastener retaining the movable base to the support base. The pipe support system can include a flexible peripheral seal around the acoustic isolator and/or between the bottom and movable bases. The pipe support system can include thermal insulation disposed over exposed surfaces of the pipe and pipe support member. Thermal insulation can be further disposed over exposed surfaces of the support base, the acoustic isolator, the movable base, or a combination thereof. A protective covering can be included over the thermal insulation.

In another embodiment, a pipe support system for dampening acoustic propagation from a pipe can include the acoustic isolator disposed for compression between opposing movable and support bases, at least one clamp connected to the movable base supporting a pipe, at least one fastener retaining the movable base to the support base and comprising a stud connected to the support base extending through a bore in the acoustic isolator and the movable base to a nut, a flexible peripheral seal between the bottom and movable bases around the acoustic isolator, thermal insulation over exposed surfaces of the pipe, the at least one clamp, the movable base, the seal, or a combination thereof, and a protective covering over the thermal insulation.

Figure 1:
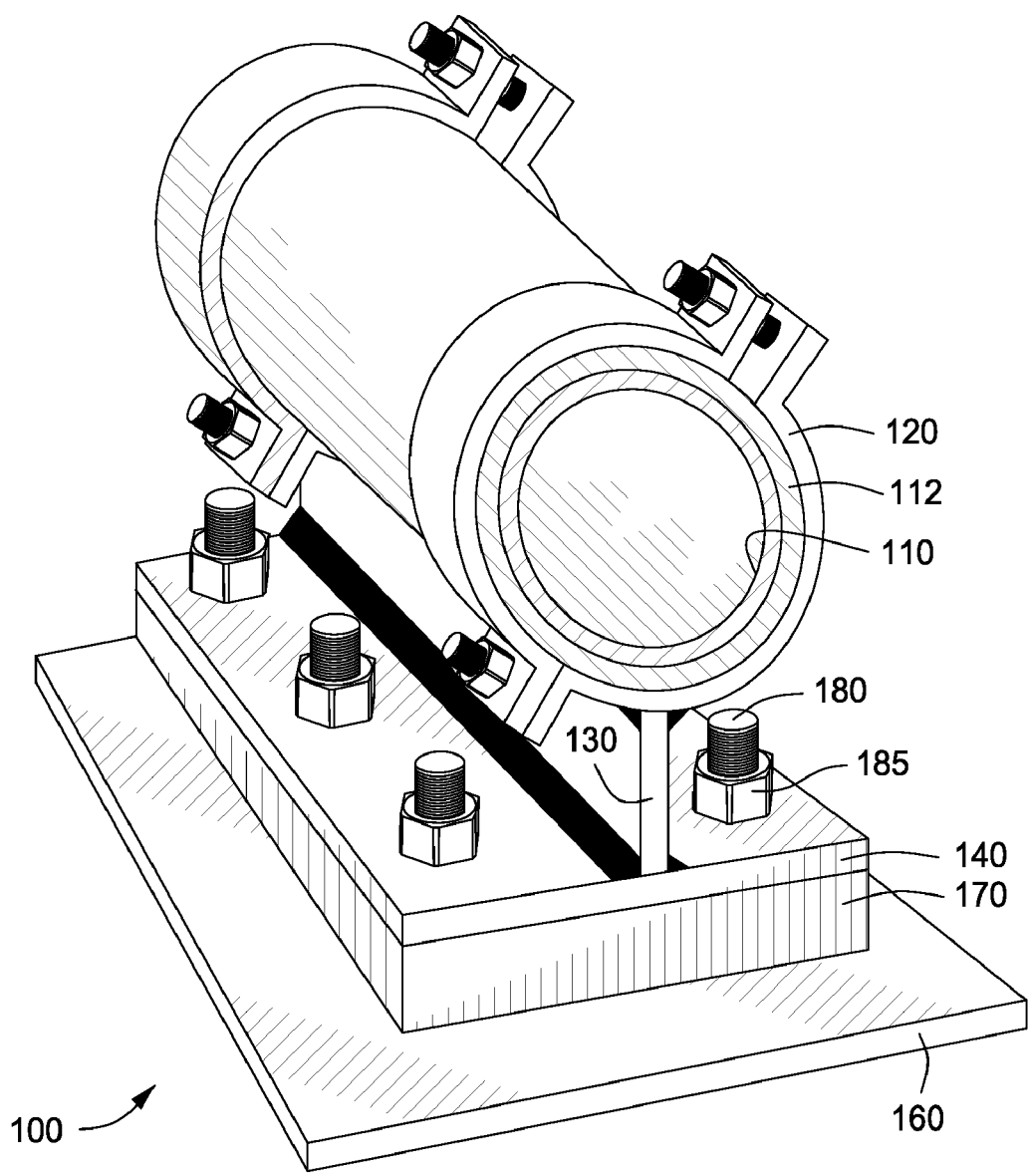
FIG. 1 depicts an overhead orthogonal illustration of an illustrative pipe support system for dampening acoustic propagation from a pipe, according to one or more embodiments described.
Figure 2:
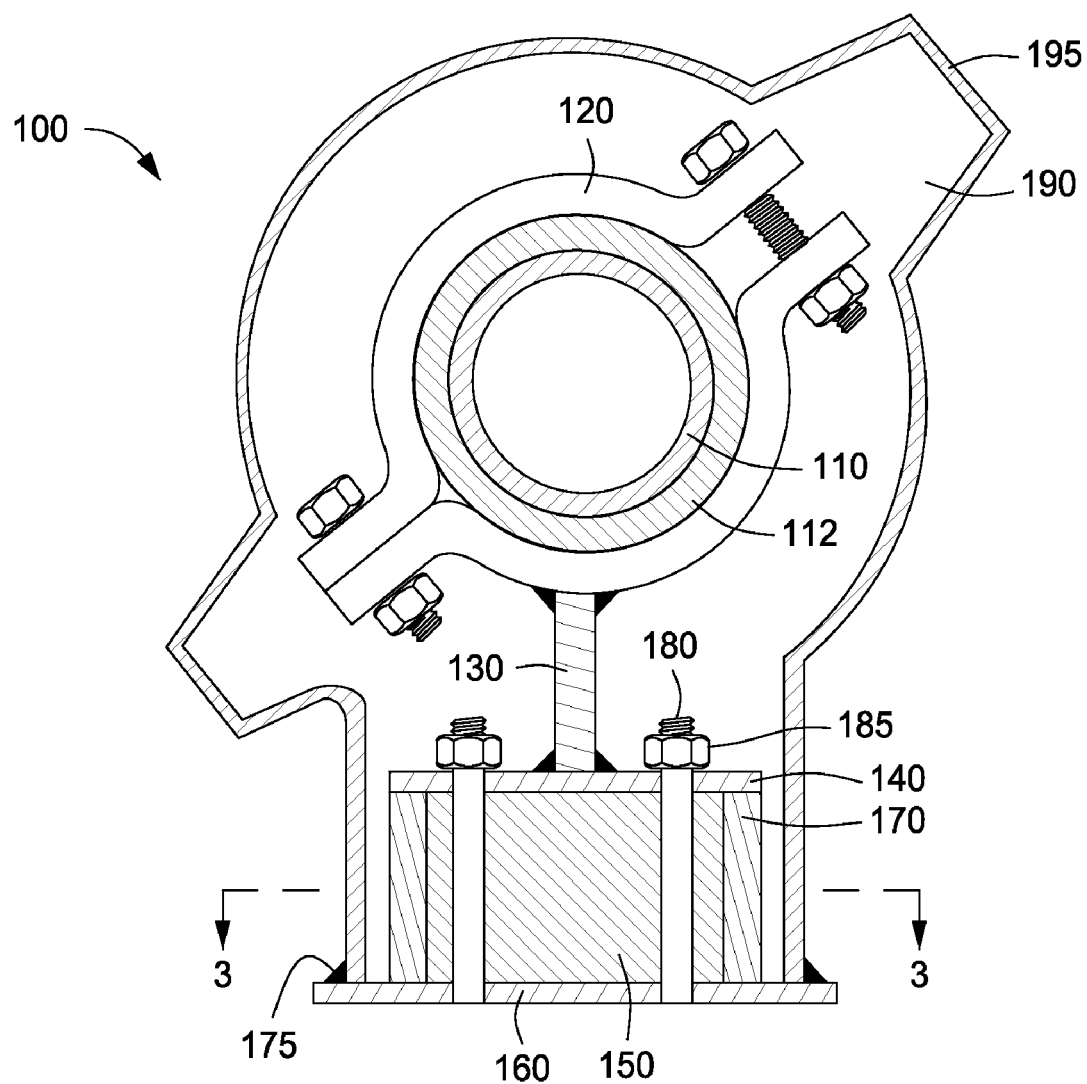
FIG. 2 depicts a vertical cross-sectional illustration of the pipe support system depicted in FIG. 1, according to one or more embodiments described.

With reference to the figures, FIG. 1 depicts an overhead orthogonal illustration of an illustrative pipe support system 100 for dampening acoustic propagation from a pipe 110, according to one or more embodiments. One or more acoustic isolators 150 can be disposed between a movable base 140 and a support base 160, as depicted in FIG. 2. The one or more acoustic isolators 150 can minimize the propagation of pipe vibration to the underlying support structure. Such vibration can be caused by fluid flow, thermal effects, and/or auxiliary equipment to which the pipeline is attached. The one or more acoustic isolators 150 can be fabricated using one or more heat resistant materials, such as fiber reinforced calcium silicate.

The pipe support system 100 can include one or more pipes 110, pipe clamps 120, support bars 130, insulation 190 and protective covering 195 can be supported by the movable base 140. The support base 160 can be permanently attached to or integral with an underlying support structure. One or more flexible peripheral seals 170 can be disposed about the outer perimeter of the one or more acoustic isolators 150, between the movable base 140 and the support base 160.

Figure 3:
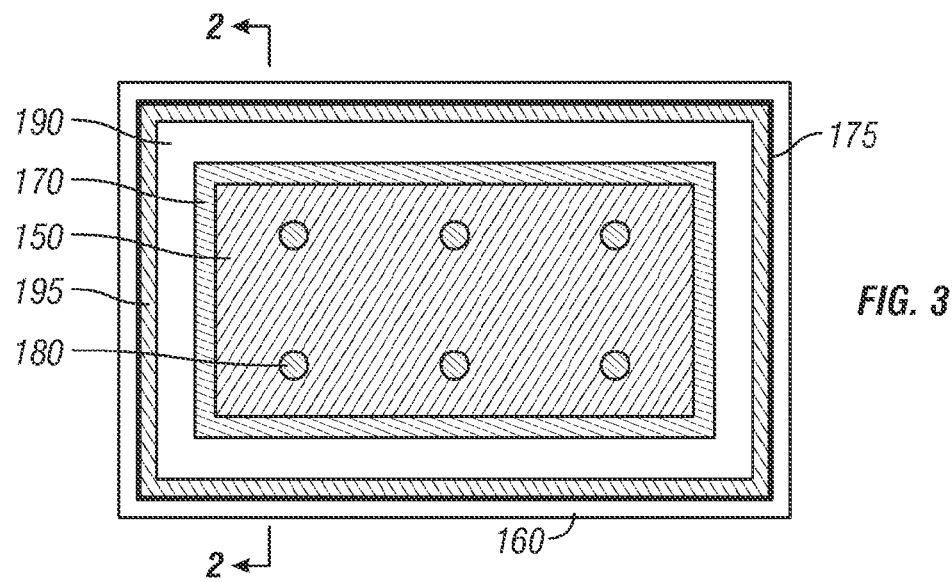
FIG. 3 depicts a horizontal cross-sectional illustration of the support base, flexible peripheral seal, and acoustic isolator of the pipe support system depicted in FIG. 2, along the line 3-3, according to one or more embodiments described.

The pipe support system 100 can include one or more clamps 120, for example a single split-clamp as depicted in FIGS. 1, 2 and 3. The one or more pipe clamps 120 can be a double bolt clamp as shown, and further can be any type of clamp known in the art, such as, for example, a single bolt clamp, a clamp with sections joined by weldment, a band type clamp, etc. The pipe support system 100 in FIGS. 1, 2, and 3 is depicted using a split-clamp 120, however any type of pipe clamping or supporting member known to one of ordinary skill in the art can be included. For example, the one or more support bars 130 can be welded directly to the pipe 110 to form an integral pipe support member if desired. In one or more specific embodiments, the one or more pipe clamps 120 can be secured directly to the pipe 110 to improve structural reliability of the pipe support system 100.

Optionally, one or more isolation materials or barriers 112 can be disposed between the pipe 110 and the clamp 120 to thermally and/or acoustically isolate the pipe 110 from the clamp 120. The barrier 112 can be continuously disposed about an outer diameter of the pipe 110. The barrier 112 can also be disposed about the pipe as one or more axially and/or radially disposed bands or strips.

The barrier 112 can be made of any material suitable for thermal and/or acoustic isolation. For example, the barrier 112 can be made of silica aerogels, woven fibers, non-woven fibers, or combinations thereof. In at least one specific embodiment, the barrier 112 can be made of a silica aerogel that is reinforced with a non-woven, glass-fiber matting, such as Pyrogel XT™ that is available from Aspen Aerogel.

The one or more pipe clamps 120 can be attached to the movable base 140 using one or more support bars 130. In one or more embodiments, the support bar 130 can be a continuous length as shown. A first end of the one or more support bars 130 can be connected via welding, or bolting at a first end to movable base 140. A second end of the one or more support bars can be attached to the pipe clamp by any means known in the art, including, but not limited to, a welding, bolting, or any other equivalent fastening system. In operation, any vibration of pipe 110 can be transmitted via the one or more pipe clamps 120 and support bars 130 to the movable base 140.

FIG. 2 depicts a vertical cross-sectional illustration of the pipe support system 100 depicted in FIG. 1, according to one or more embodiments. FIG. 3 depicts a cross-sectional illustration of the support base 160, flexible peripheral seal 170, and acoustic isolator 150 of the pipe support system 100 depicted in FIG. 2, along the line 3-3 according to one or more embodiments.

With reference to FIGS. 1, 2, and 3, the one or more acoustic isolators 150 can be subjected to a high compressive load imposed by the combined weight of the pipe 110, pipe support 130, pipe clamp 120, insulation 190, protective covering 195, and the weight of the fluid within the pipe 110. The use of a rigid material having a high compressive strength for the one or more acoustic isolators 150 can thus be particularly advantageous. In one or more embodiments, the acoustic isolator 150 can be suitable for use in ambient and/or elevated temperatures. In one or more embodiments, the one or more acoustic isolators 150 can be flame resistant and/or incombustible. The one or more acoustic isolators 150 can include one or more independent first acoustic isolators 150 disposed in one or more locations between the support base 160 and the sub-support base 140. In one or more embodiments, the acoustic isolator 150 can include one or more layers or plies of similar or dissimilar materials. One example of an acoustic isolator 150 suitable for exposure to high compressive loads can be a fiber-reinforced calcium silicate, such as that commercially available under the trade designations MARINITE, MARINITE P, MARINITE L, etc.

One or more fasteners 180 can be used to connect the movable base 140 to the support base 160. The one or more fasteners 180 can include, but are not limited to, any combination of nut, bolt, stud, weldment, washer, rivet, screw, wire, or the like. In the embodiment depicted in FIGS. 1, 2, and 3, a weldment can be formed between the one or more fasteners 180 and support base 160. The one or more fasteners 180 can extend through a complimentary bore in the one or more acoustic isolators 150, as seen best in FIG. 2, and extend through an aperture in the movable base 140. One or more nuts 185 can be threadedly attached to the proximal end of the one or more fasteners 180 to detachably attach or connect the movable base 140, the one or more acoustic isolators ("first flexible member" 150, and support base 160 together. Any number of fasteners 180 can be used, and the quantity can be more or less than the six fasteners depicted in FIGS. 1, 2, and 3.

One or more flexible peripheral seals 170 can be disposed around the one or more acoustic isolators 150. The peripheral seal 170 can cooperate with the one or more acoustic isolators 150 to aid the reduction of acoustic propagation, and can also beneficially minimize or eliminate the ingress and/or egress of fluid or contaminants to the one or more acoustic isolators 150. The peripheral seal 170 thus allows for the use of materials for the one or more acoustic isolators 150 having superior acoustic dampening characteristics, but might otherwise experience deterioration of acoustic and/or structural properties if exposed to the ambient environment, weather, and/or process fluids.

The flexible peripheral seal 170 can be provided using one or more flexible sealants having adhesive properties to form a seal against the opposing movable base 140 and support base 160. A non-limiting example of a flexible sealant for use with hot pipe 110 is an epoxy polysulfide caulk such as that commercially available under the trade designation UNICOAT 5800 (rated for temperature exposure up to 190° C. (375° F.)). Additionally, a flexible sealant can be disposed between a fastener (e.g., nut 185 and stud 180) and movable base 140 to further prevent exposure of the acoustic isolator 150. The periphery of the acoustic isolator 150 can be recessed with respect to the movable base 140 and support base 160 by the thickness of the seal 170 so that an outer surface of the seal 170 is coterminous with the edges of the top and support bases. Alternatively, the periphery of the movable base 140 and the acoustic isolator 150 can be coterminous, or offset inwardly or outwardly. As used herein, the term "hot" refers to a surface temperature of at least 90° C., such as at least 92° C., 95° C., 97° C., 100° C., 110° C., 125° C., 150° C., 200° C., 250° C., or at least 300° C.

In one or more embodiments, thermal insulation 190 can be disposed about and proximate to the one or more pipes 110. Thermal insulation 190 can include, but is not limited to, sprayed or preformed urethane foam insulation or mineral wool. As shown in the embodiment depicted in FIGS. 1, 2, and 3, the thermal insulation 190 can extend to the upper surface of the support base 160. Optionally, the thermal insulation 190 can substantially cover any portion of any otherwise thermally exposed surfaces of the pipe 110, clamp 120, support bar 130, movable base 140, acoustic isolator 150, flexible peripheral seal 170, support base 160, or any combination thereof. A protective covering 195 can be included over the thermal insulation 190. Protective covering 195 can be a thin metal sheet, for example, stainless steel or aluminum, fabric, or a coating of mastic. The thermal insulation 190 and/or protective covering 195 can be bolted, glued, and/or band strapped to the pipe 110 and/or pipe support system 100 if desired.

In one or more embodiments, the protective covering 195 can extend to the support base 160 and include an optional weather seal 175 to seal the protective covering 195 to the upper surface of the support base 160. The weather seal 175 can be an epoxy polysulfide caulk, if desired. Thermal insulation 190 and/or protective covering 195 can extend axially along the pipe 110, for example, to a second shoe of a pipe support system.

Figure 4:
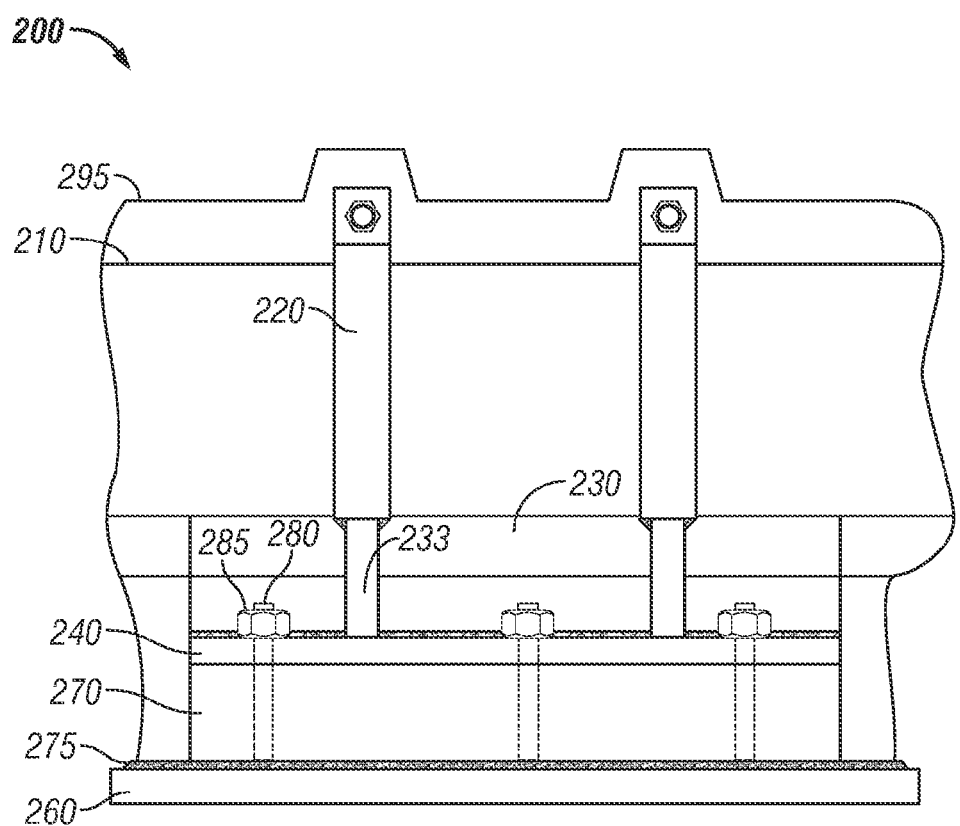
FIG. 4 depicts a side-perspective schematic illustration of a pipe support system for dampening acoustic propagation from an insulated pipe, according to one or more embodiments described.
Figure 5:
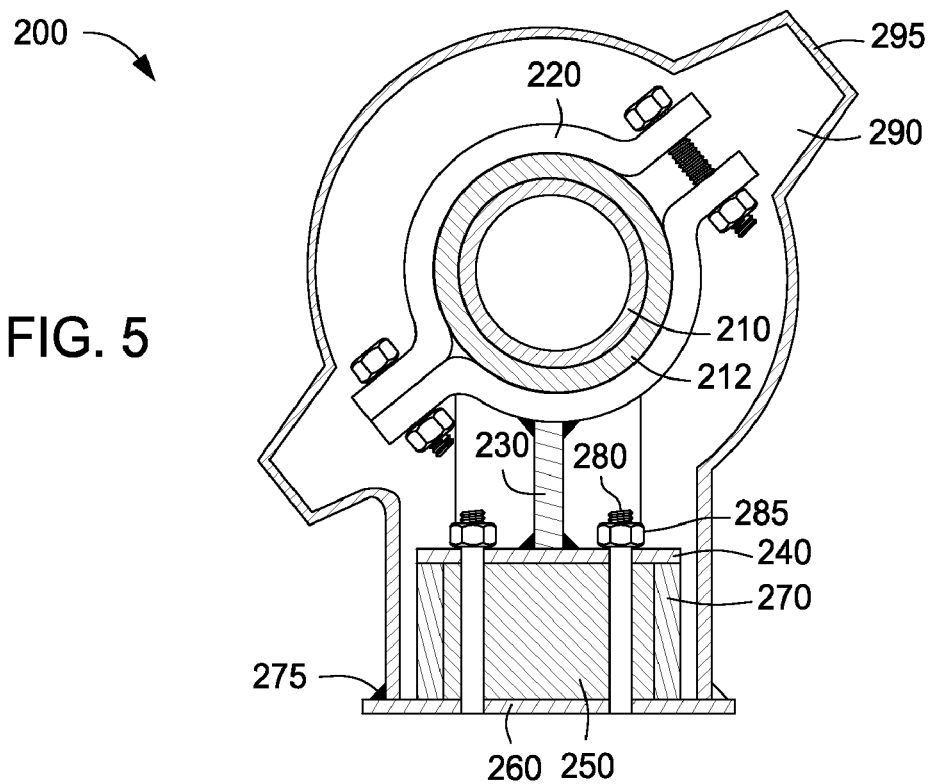
FIG. 5 depicts a cross-sectional illustration of a pipe support system depicted in FIG. 4, according to one or more embodiments described.
Figure 6:
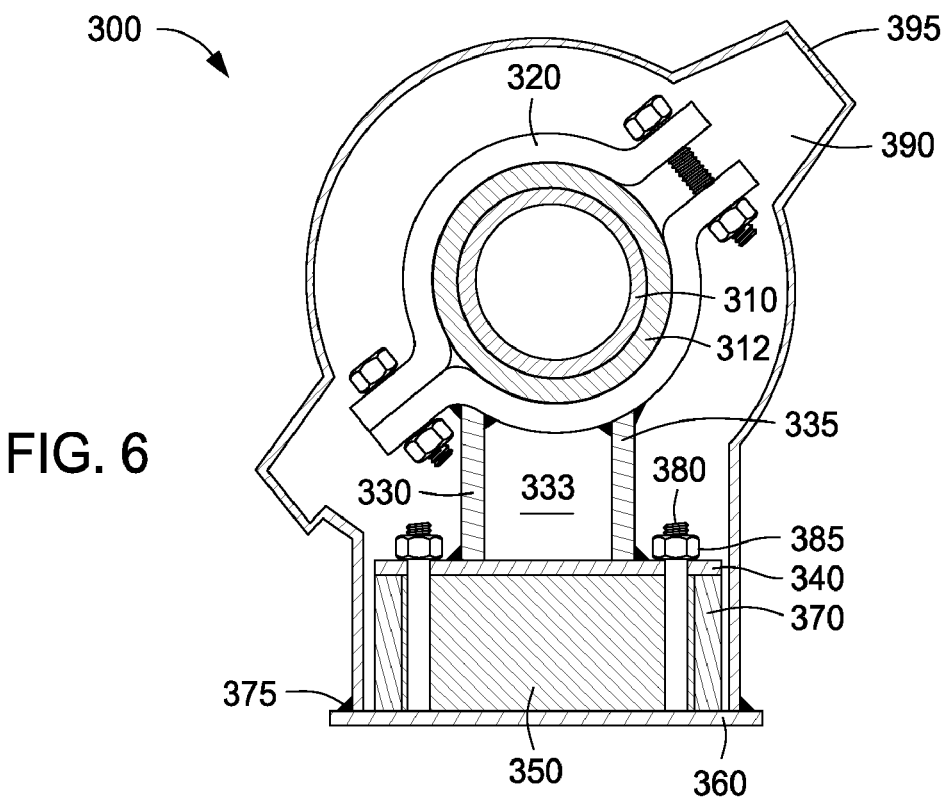
FIG. 6 depicts a cross-sectional illustration of another pipe support system, according to one or more embodiments described.
Figure 7:
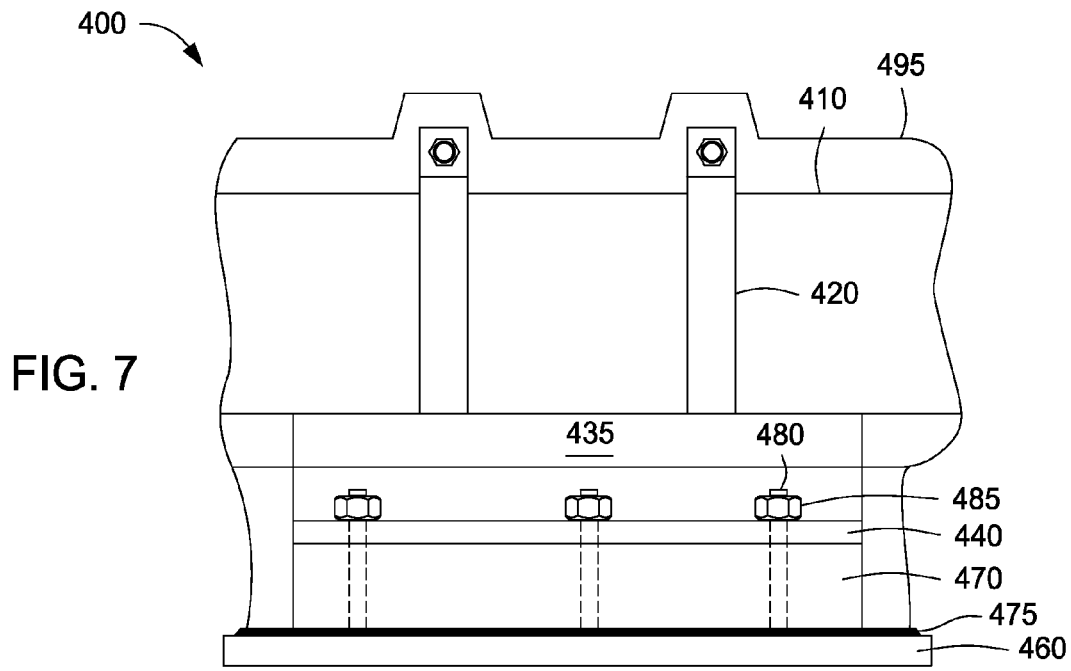
FIG. 7 depicts a side elevation of a pipe support system for dampening acoustic propagation from an insulated pipe, according to one or more embodiments described
Figure 8:
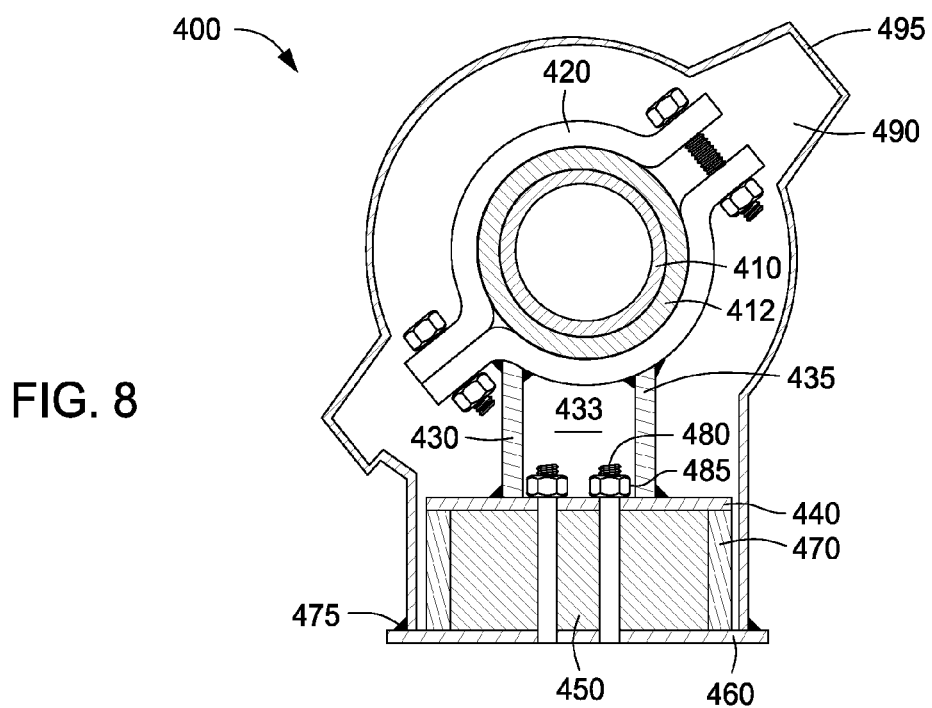
FIG. 8 depicts a cross-sectional illustration of the pipe support system depicted in FIG. 7, according to one or more embodiments described.

FIG. 4 depicts a side-perspective schematic illustration of a pipe support system 200 for dampening acoustic propagation from a pipe, according to one embodiments. FIG. 5 depicts a cross-sectional schematic illustration of the pipe support system 200 as depicted in FIG. 4. FIG. 6 depicts a cross-sectional schematic illustration of a pipe support system 300, according to one or more embodiments. FIG. 7 depicts a side-perspective schematic illustration of a pipe support system 400 for dampening acoustic propagation from an ambient or elevated temperature, insulated, pipe, according to one or more embodiments. FIG. 8 depicts a cross-sectional schematic illustration of the pipe support system 400 depicted in FIG. 7.

The embodiments depicted in FIGS. 4, 5, 6, 7, and 8 include one or more acoustic isolators (250, 350, 450) disposed between a movable base (240, 340, 440) and a support base (260, 360, 460). The movable base (240, 340, 440) can be attached to support base (260, 360, 460) using a plurality of fasteners (280, 380, 480) and nuts (285, 385, 485). A flexible peripheral seal (270, 370, 470) can be disposed between the movable (240, 340, 440) and support bases (260, 360, 460) about the perimeter of the one or more acoustic isolators (250, 350, 450).

In one or more embodiments, the pipe support system (200, 300, 400) can include thermal insulation (290, 390, 490) and/or protective covering (295, 395, 495) over all or a portion of the pipe support system (200, 300, 400) and/or pipe (210, 310, 410). In one or more embodiments, the thermal insulation (290, 390, 490) and/or protective covering (295, 395, 495) can include a weather seal (275, 375, 475) disposed along the joints formed where the protective covering (295, 395, 495) abuts the weather seal (275, 375, 475).

As mentioned above, one or more isolation materials or barriers 212, 312, 412 can be optionally disposed between the pipe 210, 310, 410 and the clamps 220, 320, 420 to thermally and/or acoustically isolate the pipe. The barrier 212, 312, 412 can be continuously disposed about an outer diameter of the pipe 110, 210, 310, 410 or disposed as one or more axially and/or radially disposed bands or strips.

The barrier 212, 312, 412 can be made of any material suitable for thermal and/or acoustic isolation. For example, the barrier can be made of silica aerogels, woven fibers, non-woven fibers, or combinations thereof. In at least one specific embodiment, the barrier can be made of a silica aerogel that is reinforced with a non-woven, glass-fiber matting, such as Pyrogel XT™ that is available from Aspen Aerogel.

In the exemplary embodiment depicted in FIGS. 4 and 5, a pipe support system 200 can include one or more pipe clamps 220 connected to movable base 240 using a support bar 230. The clamp 220 can be further supported by a gusset 233 disposed transverse to the support bar 230. The term "gusset" as used herein, should not be limited to a triangular shape, and instead can include any shape useful for improving the rigidity between two or more perpendicularly connected members, such shapes can, in various examples, be polygonal, circular or ellipsoidal.

In the embodiment depicted in FIG. 6, a pipe support system 300 can include one or more pipe clamps 320 connected to the movable base 340 using one or more support bars (two are shown, 330, 335). Optionally, the one or more pipe clamps 320 can be supported using a gusset 333 disposed transverse to the one or more support bars (330, 335).

In the embodiment depicted in FIGS. 7 and 8, a pipe support system 400 can include one or more pipe clamps 420 connected to the movable base 440 by dual support bars (430, 435). Optionally, clamp 420 can be further supported by a gusset 433 disposed transverse to the support bars (430, 435). In this embodiment, the studs 480 and nuts 485 are disposed between support bars (430, 435); however a fastener retaining the movable base 440 to a support base 460 can be disposed at any location thereof. The number of clamps and/or support bars per pipe shoe is not limited to the embodiments shown.

In yet another embodiment, an apparatus for dampening acoustic propagation from a pipeline is provided. A pipe support can include a support base and a movable base spatially arranged from the support base. One or more fasteners can be disposed through the movable base to the support base, thereby connecting the movable base to the support base. One or more acoustic isolators can be disposed between an upper surface of the support base and a lower surface of the movable base.

In one or more embodiments, the one or more acoustic isolators can include, but is not limited to a monolithic member fabricated from fiber reinforced calcium silicate. In one or more embodiments, the one or more acoustic isolators can include two or more members fabricated using one or more heat resistant materials and one or more vibration dampening materials. In one or more embodiments, the one or more heat resistant materials can be disposed about the one or more fasteners.

Figure 9:
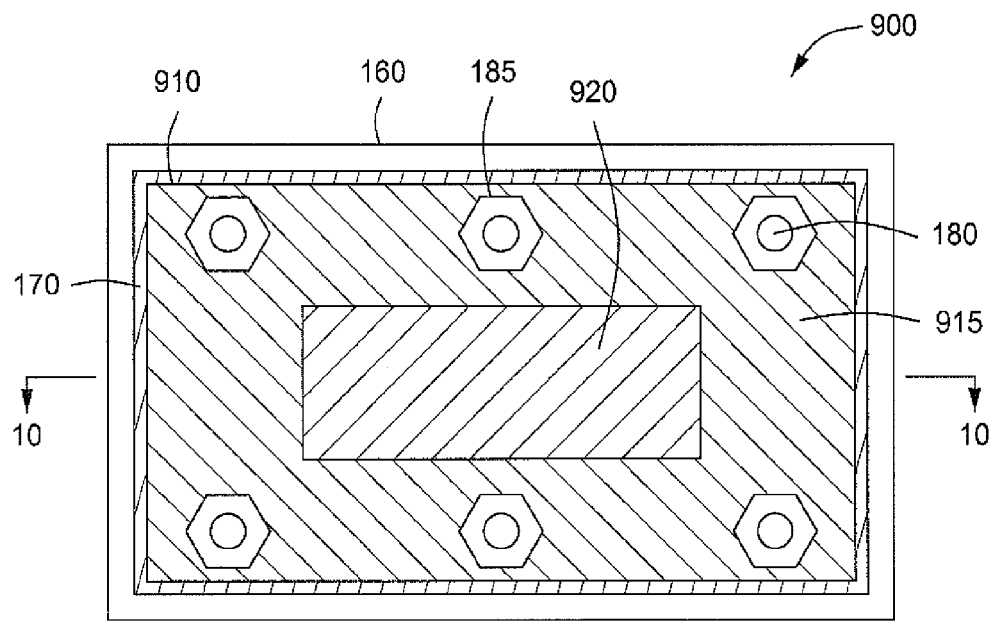
FIG. 9 depicts another horizontal cross-sectional illustration of a pipe support system according to one or more embodiments described.
Figure 10:
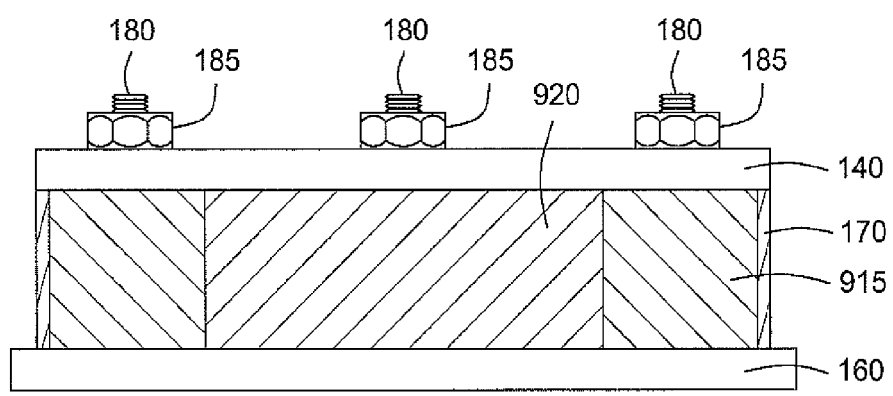
FIG. 10 depicts a vertical cross-sectional illustration of the pipe support system depicted in FIG. 9 along line 10-10, according to one or more embodiments described.

FIG. 9 depicts another horizontal cross-sectional illustration of a pipe support system 900 according to one or more embodiments. FIG. 10 depicts a vertical cross-sectional illustration of the pipe support system 900 along line 10-10, according to one or more embodiments. A composite of at least two different materials can be used to form the acoustic isolator 910 disposed between the movable base 140 and the support base 160. The composite construction of the acoustic isolator advantageously combines one or more heat resistant isolators 915 with one or more vibration absorbing materials 920 to provide a single pipe support system 900 capable of both thermally and mechanically isolating one or more pipes from an underlying support structure.

In one or more embodiments, the heat resistant isolator 915 can be formed in a hollow shape, having one or more openings disposed therethrough. In one or more embodiments, at least one of the one or more fasteners 180 connecting the movable base 140 to the support base 160 can penetrate through one or more bores through the heat resistant isolator 915. The one or more heat resistant isolators 915 can be fabricated using one or more materials suitable for high compressive loads, for example fiber-reinforced calcium silicate. Fiber-reinforced calcium silicate is commercially available under the trade designations MARINITE, MARINITE P, MARINITE L, etc. In one or more embodiments, one or more flexible peripheral seals 170 can be disposed around the one or more acoustic isolators 910.

The acoustic isolator 910, as depicted in FIGS. 9 and 10 can include a heat resistant isolator 915 in the shape of a rectangle, having a smaller rectangular opening formed therethrough. One or more independent bores can be formed in the heat resistant isolator 915 to accommodate each of the fasteners 180. In the pipe support system 900 depicted in FIG. 9, six bores through the heat resistant isolator 915 are depicted, each bore accommodating one fastener 180. One or more vibration absorbing materials 920 can be disposed within the smaller rectangular opening, partially or completely filling the opening. The one or more vibration absorbing materials 920 can include, but are not limited to, one or more elastomers, plastics, shredded plastics, fibrous plastics, mixtures thereof, or any combination thereof.

Figure 11:
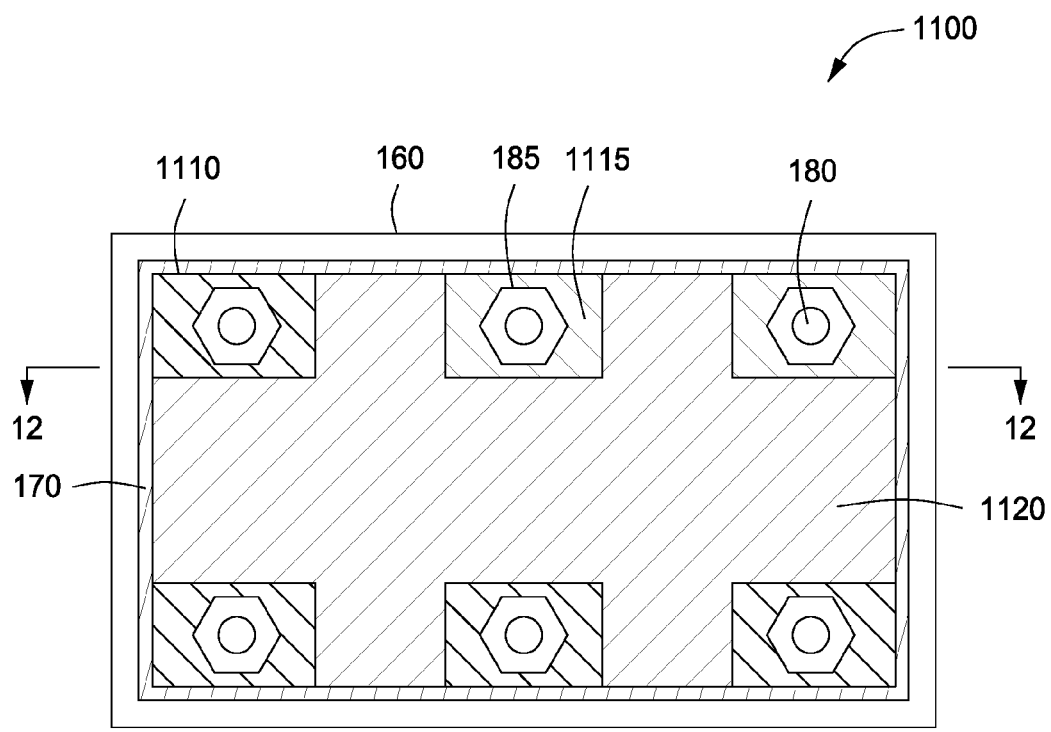
FIG. 11 depicts another horizontal cross-sectional illustration of a pipe support system according to one or more embodiments described.
Figure 12:
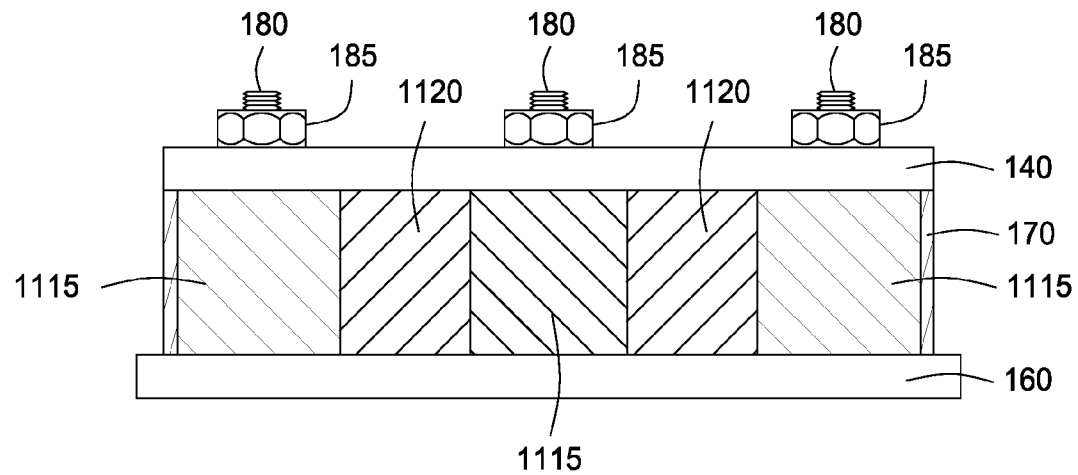
FIG. 12 depicts a vertical cross-sectional illustration of the pipe support system depicted in FIG. 11 along line 12-12, according to one or more embodiments described.

FIG. 11 depicts another horizontal cross-sectional illustration of a pipe support system 1100 according to one or more embodiments. FIG. 12 depicts a vertical cross-sectional illustration of the pipe support system 1100 along line 12-12, according to one or more embodiments. The pipe support system 1100 can include at least two different materials disposed between the movable base 140 and the support base 160. In one or more embodiments, one or more vibration absorbent materials 1120 and one or more individual, independent, heat resistant isolators 1115 can be disposed between the movable base 140 and the support base 160.

The one or more heat resistant isolators 1115 can be made in any solid or hollow geometric shape or configuration, for example rectangular, square, circular, polygonal, or any combination thereof. As depicted in FIG. 11, the one or more individual heat resistant isolators 1115 can be in the shape of a cubic or rectangular solid. In one or more embodiments, each of the one or more individual heat resistant isolators 1115 can a bore formed therethrough for disposal about each of the fasteners 180 connecting the movable base 140 to the support base 160. The one or more heat resistant isolators 1115 can be fabricated using a material suitable for high compressive loads, for example fiber-reinforced calcium silicate. Fiber-reinforced calcium silicate is commercially available under the trade designations MARINITE, MARINITE P, MARINITE L, etc.

One or more vibration absorbent materials 1120 can be disposed about the individual heat resistant isolators 1115, in the void space formed between the movable base 140, the support base 160 and the individual heat resistant isolators 1115. In one or more embodiments one or more flexible peripheral seals 170 can be disposed about the periphery of the composite isolator formed by the one or more individual heat resistant isolators 1115 and the one or more vibration absorbent materials 1120.

Figure 13:
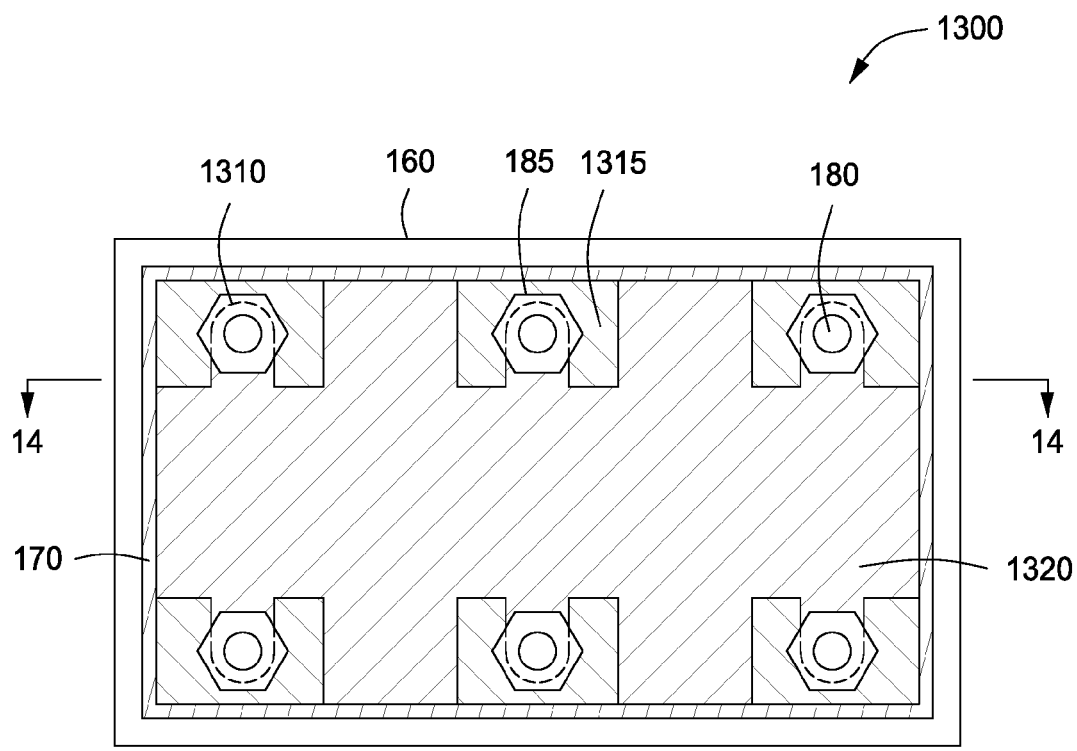
FIG. 13 depicts another horizontal cross-sectional illustration of a pipe support system according to one or more embodiments described.
Figure 14:
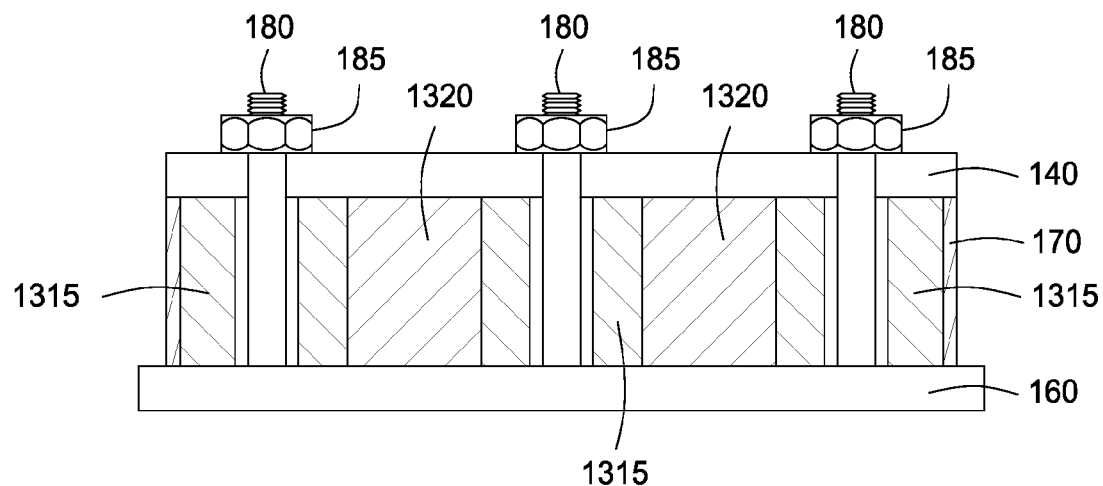
FIG. 14 depicts a vertical cross-sectional illustration of the pipe support system depicted in FIG. 13 along line 14-14, according to one or more embodiments described.

FIG. 13 depicts another horizontal cross-sectional illustration of a pipe support system 1300 according to one or more embodiments. FIG. 14 depicts a vertical cross-sectional illustration of the pipe support system 1300 depicted in FIG. 13 along line 14-14, according to one or more embodiments. Similar to the pipe support system 1100 depicted in FIGS. 11 and 12, the pipe support system 1300 can include two or more heat resistant isolators 1315 and/or vibration absorbent materials 1320 disposed between the movable base 140 and the support base 160. In one or more embodiments, one or more vibration absorbent materials 1320 and one or more individual, independent, heat resistant isolators 1315 can be disposed between the movable base 140 and the support base 160.

The one or more heat resistant isolators 1315 can be in any solid or hollow geometric shape or configuration, for example rectangular, square, circular, polygonal, or any combination thereof. As depicted in FIG. 13, the one or more individual heat resistant isolators 1315 can be formed in the shape of a cubic or rectangular solid having a notch or slot 1310 disposed thereupon. The notch or slot 1310 in each individual heat resistant isolator 1315 can enable the insertion and removal of the heat resistant isolators 1315 without requiring the complete removal of the movable base 140. The ability to remove and replace individual isolators 1315 without removing the movable base 140 can advantageously enable the repair and/or replacement of one or more heat resistant isolators 1315 without disrupting the pipe supported by the pipe support system 1300. The one or more heat resistant isolators 1315 can be fabricated using a material suitable for high compressive loads, for example fiber-reinforced calcium silicate. Fiber-reinforced calcium silicate is commercially available under the trade designations MARINITE, MARINITE P, MARINITE L, etc.

One or more vibration absorbent materials 1320 can be disposed about the individual heat resistant isolators 1315, between the movable base 140 and the support base 160. In one or more embodiments one or more flexible peripheral seals 170 can be disposed about the periphery of the composite isolator formed by the one or more individual heat resistant isolators 1315 and the one or more vibration absorbent materials 1320.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An apparatus for dampening acoustic propagation from a pipe to a support structure, comprising:
    at least one support base;
    at least one movable base, wherein the movable base is spatially arranged from the support base;
    one or more fasteners at least partially disposed through each of the support base and the movable base thereby connecting the support base and the movable base; and
    one or more acoustic isolators disposed between the support base and the movable base, wherein each acoustic isolator comprises one or more heat resistant materials and one or more vibration absorbing materials, wherein the one or more heat resistant materials comprise fiber reinforced calcium silicate and the one or more vibration absorbing materials comprise one or more plastics, one or more elastomers, or a combination thereof.

2. The apparatus of claim 1, further comprising a clamp adapted for supporting one or more members.

3. The apparatus of claim 2, wherein the member is a pipeline.

4. The apparatus of claim 1, wherein the support base is a substantially flat, metallic plate.

5. The apparatus of claim 1, wherein the support base is a metallic plate fabricated from one or more metal alloys selected from the group consisting of ferrous alloys, galvanized ferrous alloys, and non-ferrous alloys.

6. The apparatus of claim 1, wherein the movable base is a substantially flat, metallic plate.

7. The apparatus of claim 1, wherein the movable base is a metallic component fabricated from one or more metal alloys selected from the group consisting of ferrous alloys, galvanized ferrous alloys, and non-ferrous alloys.

8. The apparatus of claim 1, wherein each fastener comprises one or more studs, carriage bolts, sections of all-thread, or any combination thereof.

9. The apparatus of claim 1, wherein the one or more heat resistant materials are disposed proximate the one or more vibration absorbing materials.

10. The apparatus of claim 9, wherein the one or more heat resistant materials have a bore, notch, or channel formed therethrough for receiving one or more of the fasteners therethrough.

11. The apparatus of claim 9, wherein the one or more heat resistant materials are disposed proximate to the one or more fasteners.

12. A system for dampening acoustic propagation from a pipe to a support structure comprising:
    a support base;
    a movable base, wherein the movable base is spatially arranged from the support base;
    a fastener at least partially disposed through each of the support base and the movable base thereby connecting the support base and the movable base;
    one or more acoustic isolators disposed between the support base and the movable base, wherein each acoustic isolator comprises one or more heat resistant materials and one or more vibration absorbing materials, wherein the one or more heat resistant materials comprise fiber reinforced calcium silicate and the one or more vibration absorbing materials comprise one or more plastics, one or more elastomers, or a combination thereof;
    a clamp adapted to retain a moving member; and
    a support member disposed on a first surface of the movable base at a first end thereof, and disposed on the clamp at a second end thereof, wherein the support member is substantially perpendicular to the first surface of the movable base.

13. The system of claim 12, wherein the moving member comprises a pipeline, a structural member, a support member, a rotating member, an oscillating member, a vibrating member, or any combination thereof.

14. The system of claim 12, wherein the one or more heat resistant materials are disposed proximate the one or more vibration absorbing materials.

15. The system of claim 14, wherein the one or more heat resistant materials have a bore, notch, or channel formed therethrough for receiving the one or more of the fasteners therethrough.

16. The system of claim 14, wherein the one or more heat resistant materials are disposed proximate to the one or more fasteners.

17. A supported pipe, comprising:
    at least one pipe section;
    at least one support base;
    at least one movable base, wherein the movable base is spatially arranged from the support base and the pipe section;
    one or more fasteners at least partially disposed through each of the support base and the movable base thereby connecting the support base and the movable base; and
    one or more acoustic isolators disposed between the support base and the movable base, wherein each acoustic isolator comprises one or more heat resistant materials and one or more vibration absorbing materials, wherein the one or more heat resistant materials comprise fiber reinforced calcium silicate and the one or more vibration absorbing materials comprise one or more plastics, one or more elastomers, or a combination thereof.

18. The supported pipe system of claim 17, further comprising:
    at least one clamp adapted to retain the pipe section; and
    a support member disposed on a first surface of the movable base at a first end thereof, and disposed on the clamp at a second end thereof, wherein the support member is substantially perpendicular to the first surface of the movable base.

19. The apparatus of claim 17, wherein the one or more heat resistant materials are disposed proximate the one or more vibration absorbing materials.

20. The apparatus of claim 19, wherein the one or more heat resistant materials are disposed about the one or more fasteners.

21. An apparatus for dampening acoustic propagation from a pipe to a support structure, comprising:
    a support base;
    a movable base;

an acoustic isolator disposed between the support base and the movable base, wherein the acoustic isolator comprises one or more heat resistant materials and a vibration absorbing material, wherein the one or more heat resistant materials comprise fiber reinforced calcium silicate, wherein the vibration absorbing material comprises one or more plastics, one or more elastomers, or any combination thereof, and wherein the one or more heat resistant materials are independent from the vibration absorbing material; and a fastener connected to the support base and the moveable base.

22. The apparatus of claim 21, wherein the one or more plastics are in the form of shredded plastic, fibrous plastic, or a combination thereof.

23. The apparatus of claim 21, wherein the fastener extends through the acoustic isolator.

24. The apparatus of claim 21, wherein the fastener extends through at least one of the one or more heat resistant materials.

25. The apparatus of claim 21, wherein the one or more heat resistant materials at least partially surround the fastener.

26. The apparatus of claim 21, wherein the one or more heat resistant materials completely surround an outer perimeter of a portion of the fastener, and wherein the portion of the fastener is located between the support base and the moveable base.

27. The apparatus of claim 21, wherein the acoustic isolator comprises at least two heat resistant materials, and wherein the at least two heat resistant materials are independent from one another.

28. The apparatus of claim 21, wherein at least one of the one or more heat resistant materials is in the shape of a rectangular block and defines a bore therethrough, and wherein the vibration absorbing material is disposed within the bore.

29. The apparatus of claim 21, further comprising a support member connected to the moveable base and a clamp connected to the support member, wherein the clamp is adapted to secure a pipeline.

* * * * *